(12) United States Patent
Ludewig et al.

(10) Patent No.: US 6,642,342 B2
(45) Date of Patent: Nov. 4, 2003

(54) THERMOSETTING TWO-COMPONENT COATING COMPOSITIONS

(75) Inventors: Michael Ludewig, Köln (DE); Christoph Gürtler, Köln (DE); Detlef-Ingo Schütze, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/180,820

(22) Filed: Jun. 26, 2002

(65) Prior Publication Data

US 2003/0027969 A1 Feb. 6, 2003

(30) Foreign Application Priority Data

Jun. 29, 2001 (DE) .......................................... 101 31 463

(51) Int. Cl.$^7$ .................. C08G 18/22; C08G 18/10; C08L 75/04; C09D 175/04; B32B 27/40
(52) U.S. Cl. .................. 528/56; 428/423.4; 428/423.1; 428/425.1; 528/59; 528/65; 528/85
(58) Field of Search .................. 428/423.4, 423.1, 428/425.1; 528/56, 59, 65, 85

(56) References Cited

U.S. PATENT DOCUMENTS

| 2,916,464 A | 12/1959 | Ebneth et al. ............... 521/117 |
| 2,933,462 A | 4/1960 | Fischer ........................ 521/113 |
| 3,231,597 A | 1/1966 | Fischer ........................ 528/55 |
| 4,151,345 A | 4/1979 | Hillegass ..................... 528/56 |
| 4,248,756 A | 2/1981 | König et al. ................. 524/589 |
| 5,733,945 A | 3/1998 | Simpson ....................... 521/124 |

FOREIGN PATENT DOCUMENTS

| CA | 2212900 | 2/1998 |
| DE | 199 31 323 | 1/2001 |
| EP | 1 059 379 | 12/2000 |
| EP | 1 167 019 | 1/2002 |
| FR | 1.492.452 | 8/1967 |

OTHER PUBLICATIONS

Patent Abstracts Of Japan vol. 005, No. 144 (c–071), Sep. 11, 1981 & JP 56 076426 A (Mitui Toatsu Chem Inc), 24. Juni 1981 Zusammenfassung.

*Primary Examiner*—Rabon Sergent
(74) *Attorney, Agent, or Firm*—Joseph C. Gil; Thomas W. Roy

(57) ABSTRACT

The present invention relates to thermosetting two-component coating compositions containing
A) at least one NCO prepolymer,
B) at least one amine-free chain extender,
C) at least one catalyst selected from metal 1,3-dicarbonylates and metal-oxo 1,3-dicarbonylates, wherein
  i) the metal 1,3-dicarbonylate contains as a neutral complex a metal cation with the electron configuration $d^0$ of sub-group 3 or a lanthanide and
  ii) the metal-oxo 1,3-dicarbonylate contains a metal-oxo cation of sub-group 6 with the electron configuration $d^0$.

The present invention also relates to a process for preparing these coating compositions and to coated substrates prepared therefrom.

12 Claims, No Drawings

THERMOSETTING TWO-COMPONENT COATING COMPOSITIONS

FIELD OF THE INVENTION

The present invention relates to reactive mixtures which are based on NCO prepolymers and polyol chain extenders and are distinguished by a long pot life at room temperature and by a high reactivity at elevated temperatures, a process for their preparation and their use for coating substrates.

BACKGROUND OF THE INVENTION

Solvent-free or low-solvent two-component coating compositions based on NCO prepolymers are known. They include reactive mixtures containing functionalized prepolymers and crosslinking agents with low contents of organic solvents. These "high solids systems" then polymerize under the processing conditions and form a urethane film. Isocyanate components in which the terminal isocyanate groups are reversibly blocked by blocking agents, such as 2-butanone oxime, are employed in these systems. Curing subsequently takes place by a heat treatment, the ketoxime being split off and, where appropriate, the solvent evaporating. Reactive compositions of this type for coating flexible substrates are described in DE-A 29 02 090 (=EP-A 0 013 890, U.S. Pat. No. 4,248,756).

A disadvantage of these systems is that residues of the blocking agent always remain in the resulting coating and cause an unpleasant smell to the product. Furthermore, 2-butanone oxime is also a health risk because of its toxicological properties. Waste air treatment is therefore necessary even if the systems contain no solvent. Another disadvantage of blocking the free NCO groups is that this leads to additional urethane groups and therefore to an increase in the viscosity of the compositions, which in most cases must be compensated for by the addition of solvent.

Systems of the prior art in which splitting off of blocking agents can be omitted are also known (e.g. DE-A 196 32 925). The reactive compositions described therein contain catalysts which have a particularly high latency at room temperature, but are very reactive at elevated temperature. DE-A 196 32 925 discloses a system containing an aliphatic NCO prepolymer and a dispersed solid diol, which is reacted using a tin catalyst poisoned with sulfur. Such a system is complicated to prepare, and the choice of polyols is limited because certain particle size profiles should be maintained during grinding and the dispersion must be stabilized by various additives. However, because of the need to disperse the polyol, organic solvents must be used.

DE-A 199 31 323 describes composite structures with one or more polyurethane layers. The reactive coating compositions used contain polyols and NCO crosslinking agents. The reaction is catalyzed by nickel acetylacetonate. However, the use of these coating compositions is severely limited by the presence of relatively large amounts of a toxicologically unacceptable catalyst.

The suitability of nickel acetylacetonate as a latent catalyst system is known (e.g. U.S. Pat. No. 4,151,345) and attempts have previously been made to replace nickel by more advantageous metals. For example, the use of iron acetylacetonate and copper acetylacetonate is disclosed in DE-A 196 26 007. Both acetylacetonates are actually too reactive at room temperature to be used as latent catalysts. However, it has been found that the co-addition of additional acetylacetone is capable of eliminating this disadvantage. Nevertheless, free acetylacetone is also not toxicologically acceptable and the metal ions in question are colored.

It is an object of the present invention to provide thermosetting two-component coating compositions which do not have the disadvantages described above for the prior art. It is an additional object of the present invention to provide a new catalyst system which has a sufficiently high latency at room temperature, is sufficiently reactive at elevated temperature, is largely toxicologically and ecologically acceptable and colorless and is soluble in small amounts of organic solvent. The preparation of the coating compositions should be as simple as possible.

These objects may be achieved with the two-component coating compositions according to the present invention, which are based on NCO prepolymers and polyol chain extenders, are preferably liquid, and contain acetylacetonate complexes of sub-group three or acetylacetonate complexes of oxo compounds of sub-group six.

SUMMARY OF THE INVENTION

The present invention relates to thermosetting two-component coating compositions containing
A) at least one NCO prepolymer,
B) at least one amine-free chain extender,
C) at least one catalyst selected from metal 1,3-dicarbonylates and metal-oxo 1,3-dicarbonylates, wherein
  i) the metal 1,3-dicarbonylate contains as a neutral complex a metal cation with the electron configuration $d^0$ of sub-group 3 or a lanthanide and
  ii) the metal-oxo 1,3-dicarbonylate contains a metal-oxo cation of sub-group 6 with the electron configuration $d^0$.

The present invention also relates to a process for preparing these coating compositions and to coated substrates prepared therefrom.

DETAILED DESCRIPTION OF THE INVENTION

The coating compositions according to the invention preferably contain
A) 50 to 99 parts by wt. of an NCO prepolymer,
B) 1 to 50 parts by wt. of an amine-free chain extender and
C) 0.01 to 10 parts by wt. of at least one catalyst selected from metal 1,3-dicarbonylates and metal-oxo 1,3-dicarbonylates, wherein
  i) the metal 1,3-dicarbonylate contains as a neutral complex a metal cation with the electron configuration $d^0$ of sub-group 3 and a lanthanide and
  ii) the metal-oxo 1,3-dicarbonylate contains a metal-oxo cation of sub-group 6 with the electron configuration $d^0$,
wherein the sum of the components is 100, based on the weight of A), B) and C).

Particularly preferred are coating compositions containing 80 to 99 parts by wt. of A), 1 to 5 parts by wt. of B) and 0.05 to 1.0 parts by wt. of C), wherein the sum of the components is 100, based on the weight of A), B) and C). The equivalent ratio of free NCO groups from A) to NCO-reactive groups from B) is 0.90 to 1.35, preferably 1 to 1.25.

In the following, "average molecular weights" are in each case understood as molecular weights determined as the number-average.

NCO prepolymers A) contained in the coating compositions according to the invention have number average molecular weights of 500 to 10,000, preferably 700 to 8,000, and an NCO content of 1 to 8 wt. %, preferably 2 to 4 wt.

%. The preparation of suitable NCO prepolymers A) is carried out by reaction of monomeric organic polyisocyanates a) with NCO-reactive compounds b).

Suitable organic polyisocyanates a) include aromatic, aliphatic and cycloaliphatic polyisocyanates having an average molecular weight below 800 and corresponding to the formula $Q(NCO)_n$, wherein n is a number from 2 to 4 and Q represents an aromatic $C_6$–$C_{15}$-hydrocarbon radical, an aliphatic $C_4$–$C_{12}$-hydrocarbon radical or a cycloaliphatic $C_6$–$C_{15}$-hydrocarbon radical. Examples include 2,4- and/or 2,6-toluene-diisocyanate (TDI), diphenylmethane diisocyanate (MDI), triisocyanatononane (TIN), naphthylene diisocyanate (NDI), 4,4'-diisocyanatodicyclohexylmethane, 3-isocyanatomethyl-3,3,5-trimethylcyclohexyl-isocyanate (isophorone diisocyanate or IPDI), tetramethylene diisocyanate, hexamethylene diisocyanate (HDI), 2-methyl-pentamethylene diisocyanate, 2,2,4-trimethylhexamethylene diisocyanate (THDI), dodecamethylene diisocyanate, 1,4-diisocyanato-cyclohexane, 4,4'-diisocyanato-3,3'-dimethyl-dicyclohexyl methane, 4,4'-diisocyanato-2,2-dicyclohexylpropane, 3-isocyanatomethyl-1-methyl-1-isocyanatocyclohexane (MCI), 1,3-diisooctylcyanato-4-methyl-cyclohexane, 1,3-diisocyanato-2-methyl-cyclohexane, α,α,α',α'-tetramethyl-m- or -p-xylylene diisocyanate (TMXDI) and mixtures of these compounds.

Aliphatic and/or cycloaliphatic diisocyanates are preferred, and 4,4'-diisocyanatodicyclohexylmethane is particularly preferred. 4,4'-diisocyanatodicyclohexylmethane is used in the form of the technical-grade product with 10 to 50, preferably 15 to 25 wt. %, of trans/trans-4,4'-diisocyanatodicyclohexylmethane.

For specific uses other polyisocyanates such as those described e.g. in "Methoden der organischen Chemie" (Houben-Weyl), vol. 14/2, Georg Thieme-Verlag, Stuttgart 1963, pages 61 to 70 and by W. Siefken in Liebigs Annalen der Chemie 562, pages 75 to 136, can be used in amounts of up to 10 equivalent-%, based on the NCO groups of the total polyisocyanates a).

Suitable NCO-reactive compounds b) include the known hydroxy polyesters, hydroxy polyethers, hydroxy polythioethers, hydroxy polyacetals, hydroxy polycarbonates, dimer fatty alcohols and/or ester amides of polyurethane chemistry, which have an average molecular weight of 400 to 8,000, preferably 500 to 6,500. Preferred higher molecular weight hydroxy compounds are hydroxy polyethers, hydroxy polyesters and hydroxy polycarbonates. Also suitable in minor amounts are low molecular weight polyhydric alcohols.

Low molecular weight polyhydroxy compounds are the known polyols of polyurethane chemistry with molecular weights of 62 to 399. Examples include ethylene glycol, triethylene glycol, tetraethylene glycol, propane-1,2- and -1,3-diol, butane-1,4- and -1,3-diol, hexane-1,6-diol, octane-1,8-diol, neopentylglycol, 1,4-bis(hydroxymethyl) cyclohexane, bis(hydroxymethyl)tricyclo[5.2.1.0$^{2.6}$]decane, 1,4-bis(2-hydroxyethoxy)benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, hexane-1,2,6-triol, butane-1,2,4-triol, pentaerythritol, quinitol, mannitol, sorbitol, methyl glycoside and 4,3,6-dianhydrohexitols.

Suitable polyether polyols are the known polyethers of polyurethane chemistry, such as the addition or mixed addition compounds of tetrahydrofuran, styrene oxide, ethylene oxide, propylene oxide, butylene oxides or epichlorohydrin, preferably ethylene oxide and/or propylene oxide, prepared using di- to hexafunctional starter molecules, such as water or the abovementioned polyols or amines containing 1 to 4 NH bonds. Propylene oxide polyethers which contain on average 2 to 4 hydroxyl groups and can contain up to 50 wt. % of incorporated polyethylene oxide units are preferred.

Suitable polyester polyols include the reaction products of polyhydric, preferably dihydric and optionally trihydric alcohols with polybasic, preferably dibasic carboxylic acids. Instead of the free polycarboxylic acids, it is also possible to use the corresponding polycarboxylic acid anhydrides or corresponding polycarboxylic acid esters of lower alcohols or mixtures thereof for the preparation of the polyesters. The polycarboxylic acids can be aliphatic, cycloaliphatic, aromatic and/or heterocyclic in nature and can be optionally substituted, e.g. by halogen atoms, and/or unsaturated. Examples include adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetrahydrophthalic anhydride, maleic anhydride, maleic acid, fumaric acid, dimeric and trimeric fatty acids (such as oleic acid, optionally as a mixture with monomeric fatty acids), terephthalic acid dimethyl ester or terephthalic acid bis-glycol ester. Suitable polyhydric alcohols are the above mentioned polyols. Hydroxy polyesters which have 2 or 3 terminal OH groups and melt below 60° C. are preferred.

Suitable polycarbonate polyols are obtained by reaction of carbonic acid derivatives, e.g. diphenyl carbonate, dimethyl carbonate or phosgene, with diols. Suitable diols include ethylene glycol, triethylene glycol, tetraethylene glycol, propane-1,2- and -1,3-diol, butane-1,4- and -1,3-diol, pentane-1.5-diol, hexane-1,6-diol, octane-1,8-diol, neopentylglycol, 1,4-bis(hydroxymethyl)cyclohexane, bis(hydroxymethyl)-tricyclo[5.2.1.0$^{2.6}$]decane, 1,4-bis(2-hydroxyethoxy)benzene, 2-methyl-1,3-propanediol, 2,2,4-trimethylpentanediol, dipropylene glycol, polypropylene glycols, dibutylene glycol, polybutylene glycols, bisphenol A, tetrabromobisphenol A and mixtures thereof.

The diol component preferably contains of 40 to 100 wt. % hexane diol, preferably hexane-1,6-diol, and/or hexane diol derivatives, preferably those which contain ether or ester groups in addition to terminal OH groups. Examples include products obtained by reacting 1 mole of hexane diol with at least 1 mole, preferably 1 to 2 moles of caprolactone in accordance with DE-A 1 770 245, or by self-etherification of hexanediol to give di- or trihexylene glycol. The preparation of these derivatives is known, e.g., from DE-A 1 570 540. The polyether polycarbonate diols described in DE-A 3 717 060 can also be employed.

The hydroxy polycarbonates should be substantially linear. However, they can also optionally be slightly branched by incorporation of polyfunctional components, in particular low molecular weight polyols. Examples include trimethylolpropane, hexane-1,2,6-triol, glycerol, butane-1,2,4-triol, pentaerythritol, quinitol, mannitol, sorbitol, methyl glycoside and 4,3,6-dianhydrohexitols.

The combination of aliphatic diisocyanates as component a) and polyether diols and polyether triols as component b) is preferred for the preparation of NCO prepolymers A). The use of 4,4'-diisocyanatodicyclohexylmethane is particularly preferred.

Component A) can be prepared in known manner (e.g. Lit. J. H. Saunders, K. C. Frisch; Polyurethanes, Chemistry and Technology/II. Technology; High Polymers vol. XVI; Interscience Publishers; New York 1964; p. 8 et seq.) by reacting the polyhydroxy compounds with excess diisocyanate, preferably at 70 to 120° C. An NCO/OH equivalent ratio of 1.5:1 to 20:1, preferably 1.7:1 to 15:1 is chosen and, where appropriate, excess monomer is separated off from the prepolymer by known industrial processes, such as thin film distillation or extraction, so that a polyisocyanate residual monomer content of less than 2 wt. %, preferably less than 0.5 wt. % results. An NCO/OH equivalent ratio of 4:1 to 15:1 and subsequently separating off the monomer by thin film distillation down to a residual monomer content of less than 0:5 wt. % is particularly preferred. In the context of the present invention, it has been observed that NCO prepolymers prepared in this way show a particularly optimum ratio of long processing time on the one hand and rapid curing on the other hand.

Component A) can be mixed with up to 20 wt. %, based on the NCO prepolymer, of organic solvents for the purpose of establishing the optimum processing viscosity of 20,000 to 40,000 mPa·s at 20° C. However, the solvent-free variant is preferred.

At least 50, preferably at least 80 equivalent-%, based on the NCO-reactive groups of the chain extender, of chain extender B) is selected from compounds of formula (I)

HO—X—OH    (I)

wherein

X represents a $C_1$–$C_{10}$-alkyl, $C_1$–$C_{12}$-cycloalkyl, $C_1$–$C_{12}$-aryl, $C_1$–$C_{10}$-alkenyl, $C_1$–$C_{12}$-aralkyl or $C_1$–$C_{12}$-alkyl ether group.

Compounds of formula (I) which are liquid at room temperature or which give very concentrated solutions in very little solvent are preferred as chain extender B). 1,4-butanediol is particularly preferred.

Catalyst C) contained in the composition according to the invention comprises identical or different 1,3-dicarbonylate anions of formula (II)

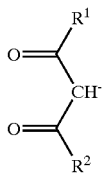

(II)

wherein $R^1$ and $R^2$ represent identical or different groups $R^3$ or $OR^3$ and $R^3$ represents a $C_1$–$C_{20}$-alkyl, $C_1$–$C_{12}$-cycloalkyl, $C_1$–$C_{12}$-aryl, $C_1$–$C_{20}$-alkenyl, $C_1$–$C_{12}$-aralkyl or $C_1$–$C_{12}$-alkyl ether group.

Preferred radicals $R^1$ and $R^2$ here are methyl, ethyl, propyl, isopropyl, butyl, sec-butyl, isobutyl, tert-butyl, phenyl, methoxy, ethoxy, propoxy, isopropoxy, butoxy, sec-butoxy, isobutoxy, tert-butoxy, benzoxy and allyloxy. Methyl, tert-butyl, methoxy and ethoxy are especially preferred radicals $R^1$ and $R^2$, which can be identical or different.

The counter-ion, the metal cation, is chosen, in the case of the metal 1,3-dicarbonylates, from metal cations with the electron configuration $d^0$ of sub-group 3 and the lanthanides. Examples include scandium(III), yttrium(III), lanthanum (III), cerium(III), praseodymium(III), neodymium(III), samarium(III), europium(III), gadolinium(III), terbium(III), dysprosium(III), holmium(III), erbium(III), thulium(III), ytterbium(III) and lutetium(III).

In the case of the metal-oxo 1,3-dicarbonylates, the metal cation is selected from the metal-oxo cations of sub-group 6 with the electron configuration $d^0$. Examples include Cr(VI)$O_2$, Mo(VI)$O_2$ and W(VI)$O_2$.

For the metal 1,3-dicarbonylates, scandium(III), yttrium (III) and lanthanum(III) are preferred, and for the metal-oxo 1,3-dicarboynlates, Mo(VI)$O_2$ is preferred.

More preferred catalysts C) are Y(acac)$_3$.xH$_2$O, La(acac)$_3$.xH$_2$O and MoO$_2$(acac)$_2$.xH$_2$O, wherein x is 0 to 3. The compound Y(acac)$_3$.xH$_2$O, wherein x is 0 to 3, is most preferred as catalyst C).

Catalyst C) has a high solubility in organic systems and is substantially colorless, stable and substantially ecologically and toxicologically acceptable.

The coating compositions according to the invention are distinguished by the fact that because of the particular properties of the catalyst, liquid chain extenders which are otherwise too reactive, such as 1,4-butanediol, can also be employed. The system remains largely stable at room temperature such that a reaction scarcely occurs. Only at temperatures above 160° C. does the reaction with the isocyanate prepolymer take place very rapidly.

The present invention also provides a process for the preparation of the coating compositions according to the invention by mixing components A), B) and C) directly with one another.

If solid compounds are employed as catalyst C) in the process according to the invention, to improve metering it is advantageous first to stir the solid compounds C) into a liquid component. The liquid component can be a solvent or component B), if this is in liquid form. In a preferred embodiment of the process according to the invention, the optionally solid component C) is dissolved in a liquid component B), such as 1,4-butanediol. 5 to 20 wt. % of a solvent is expediently added in order to prevent catalyst C) from freezing out at temperatures below the melting point of B). The mixture BC) is then mixed with A).

The mixture of dissolved component C) preferably contains 1 to 50, preferably 10 to 20 wt. % of compound C) and 50 to 99, preferably 80 to 90 wt. % of liquid component (solvent or component B).

The mixing of NCO prepolymer A) with chain extender component B) is preferably carried out to obtain an NCO/OH equivalent ratio of 0.90 to 1.35, more preferably 1.0 to 1.25.

Known higher boiling organic substances, such as dimethyl acetamide, 1-methoxy-2-propyl acetate or 2-methylpyrrolidone, can be used as the solvent.

The coating compositions according to the invention have a "pot life" of at least 4, preferably at least 8 hours. "Pot life" means the period of time from admixing chain extender B) and catalyst C) with prepolymer A) to doubling of the viscosity, measured in mPa·s at 23° C. The coating compositions according to the invention thus remain processable for a period of at least a working day after admixing of chain extender B) and catalyst C) with prepolymer A).

To prepare the ready-to-use coating compositions, additives (such as pigments, UV stabilizers, flow control agents, antioxidants, fillers and blowing agents) can be added.

The coating compositions according to the invention can be used for coating any desired substrates.

The coating compositions according to the invention can be processed in any desired manner, e.g. by pouring or pressing, but preferably by brushing on to a substrate in thin layers by the direct coating process. The transfer coating process is preferably used on textiles and leather.

The present invention also relates to a process for direct or transfer coating of substrates using the thermosetting coating compositions according to the invention as a top, adhesive, intermediate or foam coat. Preferred substrates are textiles or leather.

Suitable textiles include woven fabric of cotton, polyester/cotton, viscose staple, polyamide fibers, polyester fibers, polypropylene fibers and glass fibers; knitted and stitch goods of polyamide fibers, polyester fibers, cotton, blends of cotton with polyester and polyamide, polyamide/viscose fibers and polyamide/polyurethane fibers; and non-wovens of synthetic fibers such as polyester, polyamide, polypropylene and acrylic fibers, viscose staple and blends thereof. Microfibers are also suitable as materials to be coated.

After the substrate has been coated with the coating composition according to the invention, the coating is heated to a temperature at which the crosslinking to give the polyurethane takes place. The curing time is 2 to 18, preferably 2 to 10 minutes. The curing time means the time a 100 μm thick layer of the coating composition must be exposed to a stepwise heat treatment of 80, 120 and 160° C. (in each case one third of the total time) to give a cohesive polymer film with a virtually constant 100% modulus (according to DIN 53 504). "Virtually constant" means that the 100% modulus of a polymer film which is further heated immediately subsequently to the curing time at 160° C. for a further third of the total curing time at 160° C. does not differ from that of the polymer film produced as described above by more than 5%.

The short curing time enables coating to be carried out at a high speed. It is possible, by a particular specific chemical structure of the NCO prepolymer, to produce layers with different properties, such as an adhesive, foam, intermediate or top layer. A particular advantage is that because of their melting properties, the coatings can be welded both by means of heat and by means of high frequency below 200° C.

A transfer coating can be produced, for example, in a manner in which the composition according to the invention for the top coat is first applied in an amount of 30 to 100 g/m² to a suitable intermediate carrier, e.g. a release paper, and is cured in a drying tunnel. The adhesive coat (Impranil® EWN 13 LN, Bayer AG, Leverkusen) is applied to the dry top coat, also in an amount of 30 to 100 g/m². The substrate is laminated to this, the coating is cured in a further drying tunnel at 120 to 190° C., preferably at 140 to 170° C., and the coated substrate is peeled off from the release paper. It is also possible to produce only the top or intermediate coat by this coating process.

The coating compositions according to the invention can also be applied directly to the textile substrate in the direct coating process. The character of the coating compositions according to the invention (being free from agents which are split off and either solvent-free or low solvent content) is of great advantage in the production of thick coatings on canvas. With application amounts of 100 to 200 g/m², industrial coatings up to 0.4 mm thick can be produced in this manner in only one working operation.

If foam layers are to be produced with the coating compositions according to the invention, blowing agents and foam stabilizers can be added. Suitable additives are described e.g. in DE-A 1 794 006 and in U.S. Pat. No. 3,262,805.

Finally, the present invention relates to composite structures containing the coating compositions according to the invention and at least one substrate.

EXAMPLES

Prepolymer A1

2,004 g of a hydroxy polyether based on trimethylolpropane, propylene oxide and ethylene oxide (ratio 82/18), with a molecular weight of 6,000, and 126 g of a hydroxy polyether based on bisphenol A and propylene oxide, with a molecular weight of 560, and 29 g of a hydroxy polyether based on trimethylolpropane and propylene oxide, with a molecular weight of 450, were reacted with 2,162 g of 4,4'-diisocyanatodicyclohexylmethane (Desmodur® W, Bayer AG, Leverkusen) at 100 to 110° C. until the calculated NCO content of 14.5 wt. % was reached. 4 g of dibutyl phosphate were added and excess 4,4'-diisocyanatodicyclohexylmethane was removed by means of thin film evaporation at 150 to 180° C. under a pressure of 0.1 mbar. The prepolymer had a viscosity of 14,000 mPa·s at 23° C., an NCO content of 2.66 wt. % and an equivalent weight of 1,609.

The polyethers were prepared by KOH catalysis in known manner by the method of L. E. St. Pierre, Polyethers Part I, Polyalkylene Oxide and other Polyethers, editor: Norman G. Gaylord; High Polymers vol. XIII; Interscience Publishers; Newark 1963; p. 130 et seq.

Prepolymer A2

876 g of apolypropylene oxide based on glycerine, with an ethylene oxide tip and a molecular weight of 6000 g/mol (Acclaim® 6320, Bayer AG, Leverkusen), 720 g of a polytetrahydrofurane with a molecular weight of 1000 g/mol (Terathane® 1000, Du Pont, Wilmington) and 516 g of a polypropylene oxide based on propylene glycol, with a molecular weight of 4000 g/mol (Acclaim® 4200, Bayer AG, Leverkusen) were reacted with 2,817 g of 4,4'-diisocyanatodicyclohexyl-methane (Desmodur® W, Bayer AG, Leverkusen) at 100 to 110° C. until the calculated NCO content of 16.5 wt. % was reached. 4 g of dibutyl phosphate were added and the excess 4,4'-diisocyanatodicyclohexyl-methane was removed by means of thin film evaporation at 150 to 180° C. under a pressure of 0.1 mbar. The prepolymer had a viscosity of 12,000 mPa·s at 23° C., an NCO content of 3.28 wt. % and an equivalent weight of 1,280.

Prepolymer A3

825 g of a polytetrahydrofurane with a molecular weight of 1000 g/mol (Terathane® 1000, Du Pont, Wilmington) and 630 g of a hydroxy polyether based on trimethylolpropane, propylene oxide and ethylene oxide, with a molecular weight of 6,000, and 30.6 g of a hydroxy polyether based on trimethylolpropane and propylene oxide, with a molecular weight of 450, were reacted with 2,849 g of 4,4'-diisocyanatodicyclohexylmethane (Desmodur®® W. Bayer AG, Leverkusen) at 100 to 110° C. until the calculated NCO content of 18,97 wt. % was reached. The excess 4,4'-diisocyanatodicyclohexylmethane was removed by means of thin film evaporation at 150 to 180° C. under a pressure of 0.1 mbar. The prepolymer had a viscosity of 17,000 mPa·s at 23° C., a titrated NCO content of 4.14 wt. % and an equivalent weight of 1,014.

Component B

Dry 1,4-butanediol

Component C 10 g of yttrium acetylacetonate trihydrate (STREM Chemicals, Newburryport), dissolved in 90 g of N-methylpyrrolidine.

Component BC 10 g of yttrium acetylacetonate trihydrate were dissolved in 120 g of dry 1,4-butanediol, with heating. 13 g of N-methylpyrrolidine were then added.

Example 1 (According to the Invention)

100 g of prepolymer A1) were mixed with 2.8 g of component B), 2.33 g of component C), 1 g of a silicon oil as a flow control agent (Levacast® FLSN, Bayer AG, Leverkusen) and 2 g of a sterically hindered phenolic antioxidant (Irganox® 1010, Ciba Spezialitätenchemie, Basle). The mixture had an initial viscosity of about 15,000 mPa·s, measured at 23° C., and a pot life of 24 hours. After application to a release paper in a layer thickness of approx. 100 μm, the mixture was cured by stepwise heat treatment (3 min at 80° C., 3 min at 120° C. and 3 min at 160° C.). An elastic, homogeneous film with good mechanical properties was obtained:

| | |
|---|---|
| Modulus (100%) | 1.5 MPa |
| Tensile strength | 6.1 MPa |
| Elongation at break | 660% |
| Swelling in ethyl acetate | 502% |
| Pot life | >24 h |

Alternatively, this example can also be carried out by mixing 100 g of prepolymer A1) with 3.3 g of component BC).

Example 2 (According to the Invention)

100 g of prepolymer A2) were mixed with 3.52 g of component B), 2.33 g of component C) and 1 g of a silicon oil as a flow control agent (Levacast® FLSN, Bayer AG, Leverkusen) and 2 g of a sterically hindered phenolic antioxidant (Irganox® 1010, Ciba Spezialitätenchemie, Basle). The mixture had an initial viscosity of about 15,000 mPa·s at 23° C., and a pot life of 8 hours. After application to a release paper in a layer thickness of approx. 100 μm, the mixture was cured by stepwise heat treatment (3 min at 80° C., 3 min at 120° C. and 3 min at 160° C.). An elastic, homogeneous film with outstanding mechanical properties was obtained:

| | |
|---|---|
| Modulus (100%) | 2.7 MPa |
| Tensile strength | 12.3 MPa |
| Elongation at break | 900% |
| Swelling in ethyl acetate | 392% |
| Pot life | >8 h |

Example 3 (According to the Invention)

100 g of prepolymer A3) were mixed with 4.43 g of component B), 2.33 g of component C) and 1 g of a silicon oil as a flow control agent (Levacast® FLSN, Bayer AG, Leverkusen) and 2 g of a sterically hindered phenolic antioxidant (Irganox® 1010, Ciba Spezialitätenchemie, Basle). The mixture had an initial viscosity of about 15,000 mPa·s at 23° C., and a pot life of 8 hours. After application to a release paper in a layer thickness of approx. 100 μm, the mixture was cured by stepwise heat treatment (3 min at 80° C., 3 min at 120° C. and 3 min at 160° C.). An elastic, homogeneous film with outstanding mechanical properties was obtained:

| | |
|---|---|
| Modulus (100%) | 3.9 MPa |
| Tensile strength | 14.6 MPa |
| Elongation at break | 750% |
| Swelling in ethyl acetate | 358% |
| Pot life | >8 h |

Use Example

This example describes the production of a textile coating from a cotton substrate, an adhesive coat and a top coat by the transfer process. The adhesive coat paste is the commercial product Impranil® EWN 13 Solution N (Bayer AG, Leverkusen), and for the top coat paste the composition of Example 1 was used, together with 10 wt. % of a commercially available ground pigment paste (Isoversal® Schwarz DI, ISL Chemie, Kürten), 1 wt. % silicone oil and 25 wt. % of calcium carbonate (Calcidar® 5, Omyah, Cologne)as a filler.

On a coating machine with two brushing units, the above top layer paste was applied to a release paper in an amount of 80 g/m² using a doctor blade and was cured in a drying tunnel at 180° C. for three minutes. The adhesive coat paste was knife-coated onto the cured top coat in an amount of 40–50 g/m² on the second brushing unit in an analogous manner. The textile web in the form of flannelette cotton goods was then laminated to this. The adhesive coat was dried in a second drying tunnel with an increasing temperature profile up to max. 150° C. over a period of 3 minutes.

The coating had a surface hardness of Shore A 70 and had good resistance to buckling and good fastness to light.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermosetting two-component coating composition comprising

A) at least one NCO prepolymer,

B) at least one amine-free chain extender,

C) catalyst comprising an yttrium 1,3-dicarbonylate.

2. The thermosetting two-component coating composition of claim 1 comprising 50 to 99 parts by wt. of an NCO prepolymer A), 1 to 50 parts by wt. of amine-free chain extender B) and 0.01 to 10 parts by wt. of catalyst C), wherein the sum of the components is 100, based on the weight of components A), B) and C).

3. The thermosetting two-component coating composition of claim 1 wherein NCO prepolymer A) has a number average molecular weight of 500 to 10,000.

4. The thermosetting two-component coating composition of claim 1 wherein chain extender B) comprises at least 50 equivalent-%, based on the NCO-reactive groups of the chain extender, of a compound of formula (I)

$$HO—X—OH \qquad (I)$$

wherein

X represents a $C_1$–$C_{10}$-alkyl, $C_3$–$C_{12}$-cycloalkyl, $C_6$–$C_{12}$-aryl, $C_2$–$C_{10}$-alkenyl, $C_7$–$C_{12}$-aralkyl or $C_1$–$C_{12}$-alkyl ether group.

5. The thermosetting two-component coating composition of claim 1 wherein chain extender B) is liquid at room temperature.

6. The thermosetting two-component coating composition of claim 1 wherein chain extender B) comprises 1,4-butanediol.

7. The thermosetting two-component coating composition of claim 1 wherein catalyst C) comprises identical or different 1,3-dicarbonylate anions of formula (II)

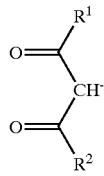

wherein $R^1$ and $R^2$ represent identical or different groups $R^3$ or $OR^3$ and $R^3$ represents a $C_1$–$C_{10}$-alkyl, $C_3$–$C_{12}$-cycloalkyl, $C_6$–$C_{12}$-aryl, $C_2$–$C_{10}$-alkenyl, $C_7$–$C_{12}$-aralkyl or $C_1$–$C_{12}$-alkyl ether group.

8. The thermosetting two-component coating composition of claim 1 wherein catalyst C) comprises $Y(acac)_3 \cdot xH_2O$, wherein x is 0 to 3.

9. A process for the preparation of the coating composition of claim 1 which comprises mixing components A), B) and C).

10. The process of claim 9 which comprises dissolving component C) in liquid component B) and mixing the resulting mixture BC) with component A).

11. A coated substrate coated with the thermosetting coating composition of claim 1.

12. The coated substrate of claim 11 wherein the substrate is a textile or leather.

* * * * *